US008271230B2

(12) United States Patent
Federer et al.

(10) Patent No.: US 8,271,230 B2

(45) Date of Patent: Sep. 18, 2012

(54) SYSTEM AND METHODS FOR MONITORING A THERMOELECTRIC HEATING AND COOLING DEVICE

(75) Inventors: Paul Federer, Wolhusen (CH); Daniel Bommer, Winterhur (CH); Guido Grueter, Gisikon (CH); Stefan Job, Rotkreuz (CH); Thomas Schlaubitz, Meggen (CH)

(73) Assignee: Roche Molecular Systems, Inc., Pleasanton, CA (US)

( * ) Notice: Subject to any disclaimer, the term of this patent is extended or adjusted under 35 U.S.C. 154(b) by 376 days.

(21) Appl. No.: 12/638,791

(22) Filed: Dec. 15, 2009

(65) Prior Publication Data

US 2010/0153066 A1 Jun. 17, 2010

(30) Foreign Application Priority Data

Dec. 16, 2008 (EP) .................................... 08171856

(51) Int. Cl.
*G06F 17/18* (2006.01)
*G06F 19/00* (2006.01)

(52) U.S. Cl. ....................................................... 702/181

(58) Field of Classification Search ................... 702/181
See application file for complete search history.

(56) References Cited

U.S. PATENT DOCUMENTS

| | | | | |
|---|---|---|---|---|
| 4,683,195 | A * | 7/1987 | Mullis et al. | 435/6.11 |
| 4,683,303 | A * | 7/1987 | Pfaendler | 540/362 |
| 4,800,159 | A * | 1/1989 | Mullis et al. | 435/91.2 |
| 4,965,188 | A * | 10/1990 | Mullis et al. | 435/6.12 |
| 5,515,682 | A * | 5/1996 | Nagakubo et al. | 62/3.7 |
| 6,232,543 | B1 * | 5/2001 | Nagata | 136/242 |
| 6,891,353 | B2 * | 5/2005 | Tsukamoto et al. | 320/136 |
| 2005/0103642 | A1 * | 5/2005 | Carson et al. | 205/688 |
| 2005/0144273 | A1 | 6/2005 | Dan et al. | |

FOREIGN PATENT DOCUMENTS

| | | | |
|---|---|---|---|
| EP | 1127619 | B1 | 10/2003 |
| EP | 1386666 | A1 | 2/2004 |
| EP | 2 198 968 | * | 6/2010 |

* cited by examiner

*Primary Examiner* — Michael Nghiem
(74) *Attorney, Agent, or Firm* — M. Reza Savari

(57) ABSTRACT

Disclosed herein are methods for monitoring a thermoelectric heating and cooling device (103, 203, 303) of a system (100, 200, 300) for cycling liquid reaction mixtures through a series of temperature excursions, and such systems adapted to perform these methods. A first quantity being either an electric current or an electric voltage is applied to the heating and cooling device (103, 203) or a portion (314) thereof (303), and a second quantity being either the non-selected first quantity or temperature is measured to obtain a first test value. The selected first quantity is applied to another thermoelectric heating and cooling device (104, 204) or another portion (315) of the first device (303), and the second quantity is measured to obtain a second test value. Comparison of the first and second test values yields a monitoring value which is compared with a pre-defined threshold value to obtain a monitoring result.

12 Claims, 3 Drawing Sheets

SYSTEM AND METHODS FOR MONITORING A THERMOELECTRIC HEATING AND COOLING DEVICE

RELATED APPLICATIONS

The present application claims the benefit of European Patent Application 08171856.1 filed Dec. 16, 2008, the entire contents of which is hereby incorporated herein by reference in its entirety.

FIELD OF THE INVENTION

The present invention is in the field of automated systems for cycling liquid reaction mixtures through a series of temperature excursions using thermoelectric heating and cooling devices and more particularly relates to systems and methods for monitoring a thermoelectric heating and cooling device.

BACKGROUND OF THE INVENTION

Nucleic acids (DNA=deoxyribonucleic acid, RNA=ribonucleic acid) are frequently used as starting materials for various analyses and assays in medical and pharmaceutical research, clinical diagnosis and genetic fingerprinting which typically require high quantity nucleic acids input. As a matter of routine, adequate quantities of nucleic acids may readily be obtained by means of in-vitro amplification techniques, e.g., based on the polymerase chain reaction (PCR).

Amplification of nucleic acids based on PCR has been extensively described in patent literature, for instance, in U.S. Pat. Nos. 4,683,303, 4,683,195, 4,800,159 and 4,965,188. Basically, the PCR includes a multiply repeated sequence of steps for the amplification of nucleic acids, wherein in each sequence

- nucleic acids are melted (denaturated) to obtain denatured polynucleotide strands,
- primers are annealed to the denaturated polynucleotide strands, and
- the primers are extended to synthesize new polynucleotide strands along the denaturated strands to thereby obtain new copies of double-stranded nucleic acids.

Due to the fact that reaction rates in the PCR-reactions vary with temperature, the samples are cycled through predefined temperature profiles in which specific temperatures are kept constant for selected time intervals. The temperature of the samples typically is raised to around 90° C. for melting the nucleic acids and lowered to approximately 40° C. to 70° C. for primer annealing and primer extension along the denaturated polynucleotide strands.

In daily routine, automated apparatus (thermal cyclers) are being used for cycling the reaction mixtures through the temperature excursions which typically include a temperature-controlled block used for heating or cooling the nucleic acids containing samples. As, for instance, is described in US-patent application 2005/0145273 A1, temperature-control of the block typically involves the use of thermoelectric heating and cooling devices utilizing the Peltier effect ("Peltier devices"). Connected to a DC power source, each of the Peltier devices functions as a heat pump which can produce or adsorb heat to thereby heat or cool the samples depending upon the direction of electric current applied. Accordingly, the temperature of the samples can be changed according to a predefined cycling protocol as specified by the user applying varying electric currents to the Peltier devices.

Conventional Peltier devices usually can be cycled several ten thousand times until failure is likely to occur. As detailed in above US-patent application, Peltier devices may experience fatigue of solder joints electrically connecting individual pellets each Peltier device typically is provided with, resulting in an increase of the electric resistance of the Peltier devices which in turn aggravates fatigue to thereby cause rapid failure.

In modern thermal cyclers, failure of a Peltier device is an error which causes a current run to be stopped normally requiring the samples running for amplification to be discarded. However, since the nucleic acids containing samples may be unique in a sense that they can hardly or even not be re-obtained such as in certain forensic applications, accidental stops due to failure of Peltier devices must be avoided. Hence, Peltier devices have to be replaced in good time before failure is likely to occur.

Conventionally, Peltier devices are replaced after a preset number of thermal cycles performed. As a considerable variability in non-failure cycles of Peltier devices is experienced, a convenient trade-off between expected life-time and risk of failure must be found which, on the one hand, increases costs as Peltier devices may be replaced too early and, on the other hand, decreases liability of the thermal cycler since failure of at least some Peltier devices may not be prevented.

In order to solve that problem, the above-cited US patent application discloses a method in which upon each initial turn-on of the thermal cycler an AC resistance of the Peltier devices is measured to detect their likeliness to fail. More specifically, based on storing an AC resistance time history of each of the Peltier devices, a currently measured resistance value of an individual Peltier device is compared with a previously measured resistance value of the same Peltier device, and, in case AC resistance of the Peltier device increases by 5% with respect to the previous record, it is assumed that the Peltier device will soon fail and is marked to be replaced.

As a matter of fact, AC resistance values of the Peltier devices markedly depend on external influences such as ambient temperature requiring such influences to be compensated using complex correction algorithms. Hence, such method involves rather complicated calculations and is thus difficult to perform and, due to the fact that the liability of the results depends on the correction algorithms chosen, may not be significant either.

The present invention has been achieved in view of the above problems. It is an object of the invention to provide an improved method for monitoring Peltier devices in thermal cyclers which is easy to perform, reliable in use and helps save costs in identifying Peltier devices which are likely to fail soon so that these Peltier devices can be selectively replaced in a timely manner.

SUMMARY OF THE INVENTION

According to a first aspect, the invention proposes a new method for monitoring a thermoelectric heating and cooling device of a system for cycling liquid reaction mixtures through a series of temperature excursions.

Accordingly, a method for monitoring (testing the probability of failure of) a thermoelectric heating and cooling device, in the following called "Peltier device", is provided which comprises the following steps:

A first quantity selected from an electric current (I) and an electric voltage (U) is applied to the Peltier device and a second quantity selected from the non-selected first quantity and temperature of the Peltier device is measured to obtain a first test value. The first test value may be derived from a measured value according to a predefined rule for deriving the test value from the measured value. For instance, when a constant current is applied to the Peltier device and an electric voltage dropping across the Peltier device is measured, an electric resistance of the Peltier device may be derived from the measured voltage drop. Otherwise, the first test value may be chosen to be identical to the measured value.

The above-selected first quantity is (e.g. simultaneously) applied to at least another Peltier device and the above-selected second quantity is measured to obtain a second test value. Similarly to the first test value, the second test value may be derived from a measured value according to the predefined rule for deriving the test value from the measured value. Otherwise, the second test value may be chosen to be identical to the measured value.

A monitoring value is determined on basis of a comparison between the first and second test values. In that, for instance, a difference between first and second resistance values is calculated to thereby obtain a relative (percentaged) resistance value with respect to the first and/or second resistance values.

The monitoring value is compared with at least one predefined (selectable) threshold value for said monitoring value according to a predefined rule for comparing the monitoring value with the threshold value to thereby obtain a monitoring result indicating a probability of failure of the Peltier device. In that, for instance, a first monitoring result indicating a first probability of failure of the Peltier device (e.g. Peltier device will not fail soon) is obtained in case the monitoring value is below the threshold value and a second monitoring result indicating a second probability of failure of the Peltier device (e.g. Peltier device will fail soon) is obtained in case the monitoring value at least equals the threshold value. Alternatively, the monitoring result may be compared to plural threshold values to thereby obtain gradually scaled monitoring results indicating probabilities for the failure of the Peltier device. The threshold value typically is based on experience and, for instance, may be an empirical value obtained in testing failure of a larger number of Peltier devices.

Hence, since the monitoring result is obtained in referring to another Peltier device being similarly influenced by external conditions as the Peltier device under consideration, the use of complicated compensation algorithms due to varying external conditions may advantageously be avoided making the method easy to perform and reliable in use.

The method is based on the assumption that the Peltier devices used for comparing the test results will not fail at a same time which, due to the wide variability of life-times, most often is the case. Measuring the second quantity, the first quantity may be simultaneously applied to both Peltier devices. Alternatively, the first quantity may be applied subsequently applied to the Peltier devices after elapse of a predefined time period as long as varying external conditions will not significantly influence the measured values of the second quantity of the Peltier devices.

According to a second aspect, the invention proposes another new method for monitoring a Peltier device of a system for cycling liquid reaction mixtures through a series of temperature excursions.

Accordingly, a method for monitoring (testing the probability of failure of) a Peltier device is provided which comprises the following steps:

A first quantity selected from an electric current (I) and an electric voltage (U) is applied to a portion of the Peltier device and a second quantity selected from the non-selected first quantity and temperature of the Peltier device is measured to obtain a first test value. The first test value may be derived from a measured value according to a predefined rule for deriving the test value from the measured value or may be chosen to be identical to the measured value:

The above-selected first quantity is (e.g. simultaneously) applied to at least another portion of the Peltier device and the above-selected second quantity is measured to obtain a second test value. Similarly to the first test value, the second test value may be derived from a measured value according to the predefined rule for deriving the test value from the measured value or may be chosen to be identical to the measured value.

A monitoring value is determined on basis of a comparison between the first and second test values as above-detailed in connection with the first aspect of the invention.

The monitoring value is compared with at least one predefined (selectable) threshold value for said monitoring value according to a predefined rule for comparing the monitoring value with the threshold value to thereby obtain a monitoring result indicating a probability of failure of the Peltier device as above-detailed in connection with the first aspect of the invention.

Hence, since changing external conditions usually influence different portions of the Peltier device in equal measure and in light of the fact that the monitoring result is obtained in referring to different portions of the Peltier device, the use of complicated compensation algorithms due to varying external conditions may advantageously be avoided making the method easy to perform and reliable in use.

Above method is based on the assumption that different portions of the Peltier device will not fail at a same time. The first quantity may be simultaneously applied to both portions of the Peltier device. Alternatively, the first quantity may be subsequently applied to the portions of the Peltier device after elapse of a predefined time period as long as varying external conditions will not significantly influence the measured values of the second quantity of the portions of the Peltier device.

It may be preferable to determine an absolute value of the monitoring value to be compared with the predefined threshold value. Alternatively, it may be preferable to determine a signed value of the monitoring value to be compared with the threshold value. In the first case, according to the first aspect of the invention it is not determined which one of the Peltier devices or, according to the second aspect of the invention, which portion of the Peltier device, is likely to fail soon so that both Peltier devices and the Peltier device as a whole, respectively, have to be replaced. Such embodiment may, e.g., be advantageous in case the Peltier devices are accommodated in a same modular temperature-controlled block, adapted to be replaced as a whole. Likewise, individual Peltier devices may be modular components, adapted to be replaced as a whole. In the second case, according to the first aspect of the invention it is determined which Peltier device or, according to the second aspect of the invention, which portion of the Peltier device, is likely to fail soon so that the Peltier device and the portion of the Peltier device, respectively, identified to fail soon can be selectively replaced to thereby save costs.

According to another preferred embodiment of the invention, the monitoring result is output to a signalizing device (such as a display and/or loudspeaker) for signalizing an optical and/or acoustical signal in accordance with the monitoring result allowing an expected failure of a Peltier device to be signalized to a user.

According to another preferred embodiment of the invention, the monitoring result is determined based on a manual input signal allowing obtain a monitoring result in an arbitrary manner, e.g., each time a user has reservations as to the reliability of the Peltier devices.

According to another preferred embodiment of the invention, the monitoring result is periodically determined, for instance, each time a predefined number of thermal cycles or operating hours has been performed.

According to another preferred embodiment in accord with the first and second aspects of the invention, the test result is determined each time the system is turned on for cycling liquid reaction mixtures through a series of temperature excursions.

In another preferred embodiments in accordance with the first aspect of the invention the following steps are performed:

A first quantity selected from an electric current (I) and an electric voltage (U) is applied to the Peltier device and a second quantity selected from the non-selected first quantity and temperature is measured to obtain a first test value.

The selected first quantity is applied to plural other Peltier devices and the second quantity is measured to obtain plural second test values.

A monitoring value is determined on basis of a comparison of the first and second test values. The second test values may, for instance, be used to calculate an arithmetic means of the second test values to be compared with the first test value.

The monitoring value is compared with at least one predefined threshold value for the monitoring value to obtain a monitoring result indicating a probability of failure of the thermoelectric heating and cooling device.

Hence, in such embodiment, the Peltier device under consideration is compared to plural other Peltier devices thus advantageously reducing a risk of common failure of the Peltier devices and, e.g., accidentally high differences between first and second test values.

In another preferred embodiments in accordance with the second aspect of the invention the following steps are performed:

A first quantity selected from an electric current (I) and an electric voltage (U) is applied to a portion of the Peltier device and a second quantity selected from the non-selected first quantity and temperature is measured to obtain a first test value.

The selected first quantity is applied to plural other portions of the Peltier device and the second quantity is measured to obtain plural second test values.

A monitoring value is determined on basis of a comparison of the first and second test values. The second test values may, for instance, be used to calculate an arithmetic means of the second test values to be compared with the first test value.

The monitoring value is compared with at least one predefined threshold value for the monitoring value to obtain a monitoring result indicating a probability of failure of the thermoelectric heating and cooling device.

Hence, in such embodiment, the portion of the Peltier device under consideration is compared to plural other portions of the Peltier devices thus advantageously reducing a risk of common failure of the portions of the Peltier device and, e.g., accidentally high differences between first and second test values.

According to a third aspect, the invention proposes a new system for cycling liquid reaction mixtures through a series of temperature excursions.

Accordingly, a system for cycling liquid reaction mixtures through a series of temperature excursions is disclosed comprising:

- at least two Peltier devices for cycling the liquid reaction mixtures;
- a power source connected to the Peltier devices, adapted for supplying a first quantity selected from an electric current (I) and an electric voltage (U) to the Peltier devices;
- at least one measuring device connected to the Peltier devices, adapted for measuring a second quantity selected from the non-selected first quantity and temperature when applying the first quantity to the Peltier devices;
- a controller, set up to control: applying a first quantity selected from an electric current (I) and an electric voltage (U) to a first thermoelectric heating and cooling device and measuring a second quantity selected from the non-selected first quantity and temperature to obtain a first test value; applying the selected first quantity to at least a second thermoelectric heating and cooling device and measuring the second quantity to obtain a second test value; determining a monitoring value based on a comparison of the first and second test values; and comparing the monitoring value with a predefined threshold value for the monitoring value to obtain a monitoring result indicating a probability of failure of the thermoelectric heating and cooling device.

According to a fourth aspect, the invention proposes a new system for cycling liquid reaction mixtures through a series of temperature excursions.

Accordingly, a system for cycling liquid reaction mixtures through a series of temperature excursions is disclosed which comprises:

- at least one Peltier device for cycling the liquid reaction mixtures;
- a power source connected to the Peltier device, adapted for supplying a first quantity selected from an electric current (I) and an electric voltage (U) to the Peltier device;
- at least one measuring device connected to the Peltier device, adapted for measuring a second quantity selected from the non-selected first quantity and temperature when applying the first quantity to the Peltier device;
- a controller, set up to control: applying a first quantity selected from an electric current (I) and an electric voltage (U) to a first portion of the Peltier device and measuring a second quantity selected from the non-selected first quantity and temperature to obtain a first test value; applying the selected first quantity to at least a second portion of the Peltier device and measuring the second quantity to obtain a second test value; determining a monitoring value based on a comparison of the first and second test values; and comparing the monitoring value with a pre-defined threshold value for the monitoring value to obtain a monitoring result.

According to a preferred embodiment of each of the systems of the invention, it further comprises a signalizing device such as a display and/or loudspeaker for signalizing an optical and/or acoustical signal in accordance with the monitoring result.

The systems of the invention preferably are used for performing the polymerase chain reaction to amplify nucleic acids using at least one Peltier device. In that, the systems of the invention may be embodied as automated PCR-based instruments (thermal cyclers).

In above description, each Peltier device may contain one Peltier element or a plurality of individual Peltier elements such as semiconductor pellets for instance made of bismuth telluride which are appropriately doped to create n-type and p-type materials which can serve as dissimilar conductors for functioning as heat pump when connected to a DC power source. Plural Peltier elements may be serially connected with respect to each other, e.g., by use of metal interconnects such as solder joints. Each Peltier device is a structural and functional entity to be operated for producing or absorbing heat. Each Peltier element may be embodied as a functional entity to be operated for producing or absorbing heat. Each Peltier element may also be embodied as a structural entity to be operated for producing or absorbing heat.

BRIEF DESCRIPTION OF THE DRAWINGS

Other and further objects, features and advantages of the invention will appear more fully from the following description. The accompanying drawings, which are incorporated in and constitute a part of the specification, illustrate preferred embodiments of the invention, and together with the general description given above and the detailed description given below, serve to explain the principles of the invention.

DETAILED DESCRIPTION OF THE INVENTION

The present invention will be described in detail below with reference to the accompanying drawings, where like designations denote like or similar elements.

Figure 1:
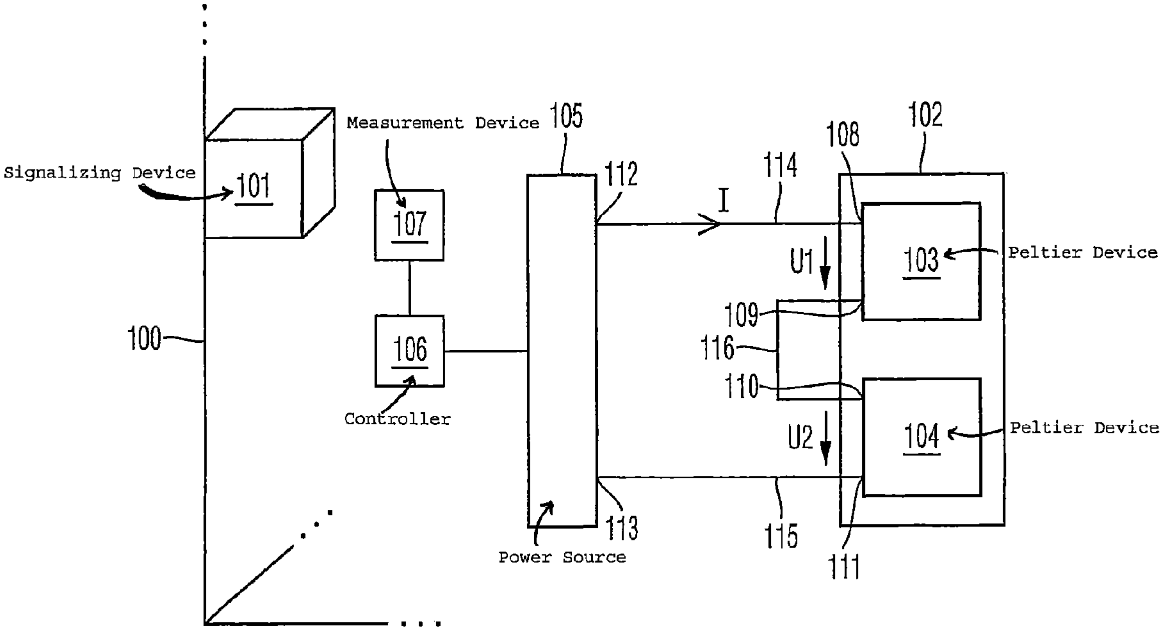
FIG. 1 is a schematic elevational view of an exemplary first embodiment of the system of the invention.
Figure 2:
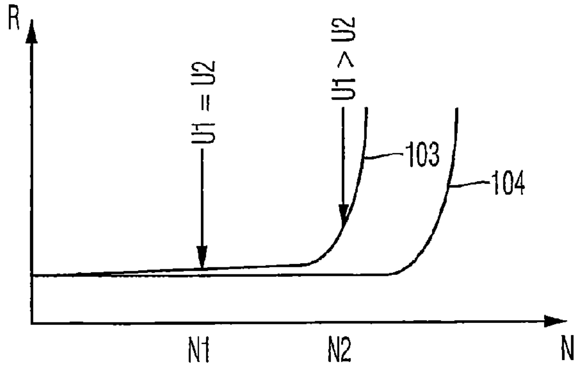
FIG. 2 is a schematic diagram illustrating developing of an electric resistance of the Peltier devices of the system of FIG. 1.

Now referring to FIGS. 1 and 2, an exemplary first embodiment of the system and method according to the invention is explained. Accordingly, a system 100 for cycling nucleic acids containing liquid reaction mixtures through a series of temperature excursions for performing the polymerase chain reaction is shown. The system 100 may embodied as a thermal cycler, adapted to multiply repeat a sequence of steps for the amplification of nucleic acids, wherein in each sequence the nucleic acids are melted to obtain denatured polynucleotide strands, primers are annealed to the denaturated polynucleotide strands, and the primers are extended to synthesize new polynucleotide strands along the denaturated strands to thereby obtain new copies of double-stranded nucleic acids.

For thermally cycling the reaction mixtures, the system 100 includes a temperature-controlled member 102 which may be embodied as a block, e.g., made of metallic material. The temperature-controlled member 102 can be arbitrarily heated or cooled by means of a modular first Peltier device 103 and a modular second Peltier device 104 which are of similar type. Each of the first and second Peltier devices 103, 104 can be identified as a functional and structural entity for producing and adsorbing heat.

While not shown in the figures, the temperature-controlled member 102 supports a sample plate forming a plurality of cavities in a two-dimensional array that may receive nucleic acids containing reaction mixtures to be thermally cycled for amplification.

The first and second Peltier devices 103, 104 are connected to a DC power source 105 by means of first and second conductive lines 114, 115 and are serially connected with respect to each other by means of third conductive line 116. Specifically, the first conductive line 114 interconnects a first terminal 108 of the first Peltier device 103 and a first pole 112 of the DC power source 105, the second conductive line 115 interconnects a second terminal 111 of the second Peltier device 104 and a second pole 113 of the DC power source 105, and the third conductive line 116 interconnects a second terminal 109 of the first Peltier device 103 and a first terminal 110 of the second Peltier device 104.

The DC power source 105 is controlled by means of a microprocessor-based controller 106 so that, for instance, a constant electric current (I) can be applied to first and second Peltier devices 103, 104 to thus heat or cool the temperature-controlled member 102 depending on the direction of current applied. A measurement device 107 is connected to first and second terminals 108-111 of the Peltier devices 103, 104 for measuring a first voltage drop (U1) across the first Peltier device 103 and a second voltage drop (U2) across the second Peltier device 104 (not further detailed in the figures).

Each of the first and second Peltier devices 103, 104 includes a plurality of Peltier elements (not further detailed in the figures) such as semiconductor pellets which are serially connected with respect to each other for instance by means of solder joints. Each of the Peltier elements can be identified as a functional and structural entity for producing and adsorbing heat.

Under control of controller 106, the temperature of temperature-controlled member 102 can be cycled through various temperature excursions operating the first and second Peltier devices 103, 104 to thereby incubate the reaction mixtures contained in the sample plate at predefined temperatures in predefined incubation intervals. The temperature of the samples may, e.g., be raised to around 90° C. for melting the nucleic acids and lowered to approximately 40° C. to 70° C. for primer annealing and primer extension along the denaturated polynucleotide strands.

Reference is now made to FIG. 2 depicting a schematic diagram of a typical developing of the electric resistances (R) of the first and second Peltier devices 103, 104 during their life-time drawn in dependency of the number (N) of cycles performed. Accordingly, FIG. 2 illustrates two separate curves pertaining to the electric resistances of the first and second Peltier devices 103, 104 as indicated by the reference numerals. As illustrated, the electric resistance of each of the Peltier devices 103, 104 rapidly increases after a specific number of cycles performed which, in view of the fact that such increase typically occurs after several ten thousand cycles, greatly varies between the Peltier devices 103, 104. The first Peltier device 103, e.g., fails after around 55000 cycles and the second Peltier device 104, e.g., fails after around 70000 cycles thus having an approximately one-fourth longer life-time.

Since the first and second Peltier devices 103, 104 are of similar type, applying a constant current (I) results in a similar voltage drop across the Peltier devices 103, 104 (U1=U2) provided that the electric resistance has not been changed due to fatigue as is illustrated at a first number N1 of cycles which for instance corresponds to about 30000 cycles performed.

The situation changes when a second number N2 of, e.g., 50000 cycles has been performed whereupon a sharp increase of the electric resistance of the first Peltier device 103 occurs. In case a constant current is applied to the first and second Peltier devices 103, 104, an increased voltage drop (U1>U2) across the first Peltier device 103 can be observed. Accordingly, an increase of the electric resistance of the first Peltier device 103 can be identified, e.g., measuring a relative difference between the first and second voltage drops (U1, U2) which increases with rising electric resistance of the first Peltier device 103.

Based on the above, an exemplary method of monitoring (testing the probability of failure of) the first and second Peltier devices 103, 104 comprises:

A first step of applying a constant current (I) by means of power source 105 and measuring the first and second voltage drops (U1, U2) across the first and second Peltier devices 103, 104 by means of the measurement device 107.

A second step of calculating a signed difference ($\Delta U = U1 - U2$) between the first and second voltage drops (U1, U2) by the controller 106 to thereby obtain a monitoring value.

A third step of comparing the monitoring value with a predefined threshold value (T1) which may be an absolute value or a relative value with respect to nominal voltage drops of the first and second Peltier devices 103, 104 to thus obtain a monitoring result indicating probability of failure of the Peltier device under consideration. For instance, in case the calculated difference ($\Delta U$) between the first and second voltage drops (U1, U2) at least equals the threshold value T1 ($\Delta U \geqq T1$), then it may be concluded that the first Peltier device 103 is likely to fail soon and should be replaced. Otherwise, in case the calculated difference ($\Delta U$) is below the threshold value T1 ($\Delta U < T1$), then it may be concluded that the first Peltier device 103 can be operated without an enlarged risk of failing soon. The threshold value (T1) may, for instance, be defined based on a relative deviation of nominal voltage drops across the first and second Peltier devices, respectively, so that failure of the Peltier devices, e.g., is considered to be likely to occur in case the calculated difference ($\Delta U$) amounts to more than 10% of the nominal voltage drops of each of the first and second Peltier devices 103, 104. The threshold value (T1) may be based on experience, e.g., gained in thermally cycling a larger number of similar Peltier devices.

Since a signed difference ($\Delta U$) of voltage drops (U1, U2) is calculated by means of the controller 106, it is possible to detect which Peltier device is likely to fail (i.e. the Peltier device which experiences an increase in voltage drop with respect to the other Peltier device). Hence, the Peltier device which is likely to fail can be selectively replaced, instead of replacing the temperature-controlled member 102 as a whole. Alternatively, in case an absolute value of the difference ($\Delta U$) of voltage drops (U1, U2) across the first and second Peltier devices 103, 104 is determined, it can be observed that one out of the Peltier devices 103, 104 is likely to fail soon without knowing which one it is, so that the temperature-controlled member 102 is to be replaced which may be appropriate in some cases.

Alternatively, instead of calculating a difference ($\Delta U$) of voltage drops (U1, U2) across the first and second Peltier devices 103, 104, a difference between electric resistances of the first and second Peltier devices 103, 104 derivable from the voltage drops (U1, U2) may be compared with a threshold value to obtain a monitoring result.

Yet alternatively, instead of measuring voltage drops (U1, U2) across the first and second Peltier devices 103, 104, first and second temperatures ($\theta 1$, $\theta 2$) of the first and second Peltier devices 103, 104, respectively, can be measured using the measurement device 107, followed by calculating a signed difference ($\Delta\theta = \theta 1 - \theta 2$) between the first and second temperatures ($\theta 1$, $\theta 2$) by the controller 106 to thereby obtain a monitoring value, which difference ($\Delta\theta$) then is compared with a predefined threshold value which may be an absolute value or a relative value with respect to nominal temperatures of the first and second Peltier devices 103, 104 to thus obtain a monitoring result indicating probability of failure of the Peltier devices 103, 104. Such embodiment is based on the fact that the temperature of a Peltier device varies with its electric resistance depending on the electric current applied.

The monitoring of the Peltier devices 103, 104 may be initiated each time the system 100 is turned on for thermally cycling reaction mixtures. Alternatively, the monitoring of the Peltier devices 103, 104 may be initiated based on a manual input signal. Yet alternatively, the monitoring of the Peltier devices 103, 104 may be initiated each time a predefined number of thermal cycles or operating hours has been performed.

Based on measuring an increase of the difference ($\Delta U$) of voltage drops (U1, U2) across the first and second Peltier devices 103, 104, failure of the Peltier devices can advantageously be avoided replacing them in a timely manner. Since an increase in electric resistance of one Peltier device is detected referring to another Peltier device, any influence of changes in external conditions such as various ambient temperatures can advantageously be avoided thus making the method easy to perform and reliable in use.

The determined monitoring result is signalized to a user by means of a signalizing device 101 such as a display and/or loudspeaker.

Figure 3:
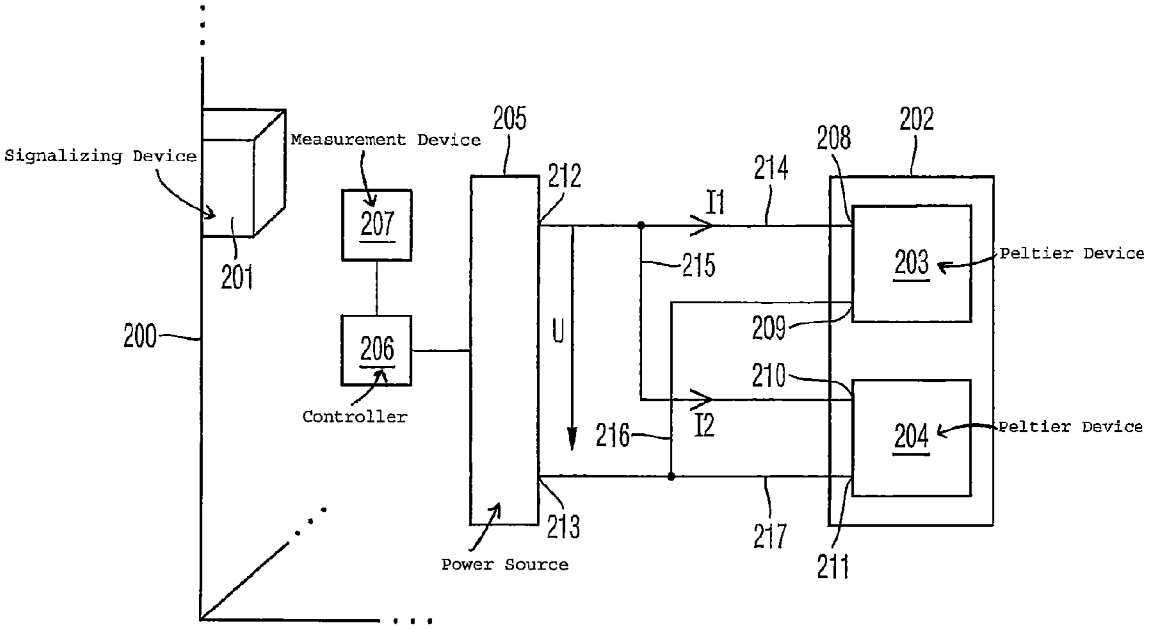
FIG. 3 is a schematic elevational view of an exemplary second embodiment of the system of the invention.
Figure 4:
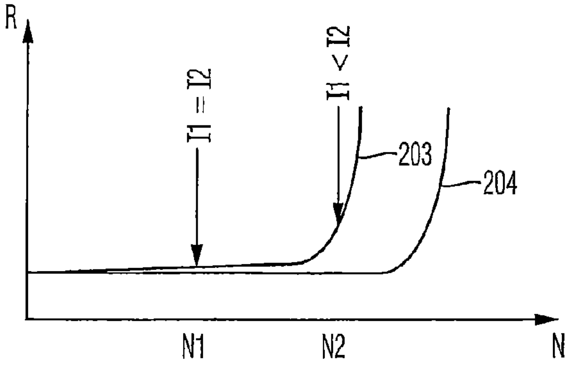
FIG. 4 is a schematic diagram illustrating developing of an electric resistance of the Peltier devices of the system of FIG. 3.

Now referring to FIGS. 3 and 4, an exemplary second embodiment of the system and method according to the invention is explained. In order to avoid unnecessary repetitions, only differences with respect to the first embodiment of the invention are explained and otherwise reference is made to explanations made above in connection with the first embodiment.

Accordingly, a system 200 for cycling liquid reaction mixtures through a series of temperature excursions for performing the polymerase chain reaction includes a temperature-controlled member 202 which can be heated and cooled, respectively, by means of a first Peltier device 203 and a second Peltier device 204 which are of similar type.

The first and second Peltier devices 203, 204 are connected to DC power source 205 in parallel relationship with respect to each other. More specifically, a first conductive line 214 interconnects a first terminal 208 of the first Peltier device 203 and a first pole 212 of the DC power source 205, a second conductive line 215 interconnects the first conductive line 214 and a first terminal 210 of the second Peltier device 204, and a third conductive line 216 interconnects a second terminal 209 of the first Peltier device 203 and a fourth conductive line 217 interconnecting a second terminal 211 of the second Peltier device 204 and a second pole 213 of the DC power source 205.

The DC power source 205 can be controlled by means of a microprocessor-based controller 206 so that, for instance, a constant electric voltage (U) can be applied to both the first and second Peltier devices 203, 204 to thus heat or cool the temperature-controlled member 202 depending on the polarity of the voltage applied. A measurement device 207 is connected to the first and second terminals 208-221 of the first and second Peltier devices 203, 204 for measuring a first current (I1) running through the first Peltier device 203 and a second current (I2) running through the second Peltier device 204 when applying a constant voltage (U) to the first terminal 208 of the first Peltier device 203 and the second terminal 211 of the second Peltier device 204.

Reference is now made to FIG. 3 depicting a schematic diagram of a typical developing of the electric resistance of the first and second Peltier devices 203, 204 during their life-times analogously to FIG. 2. Since first and second Peltier devices 203, 204 are of similar type, applying of a constant voltage (U) results in similar currents (I1, I2) running through the Peltier devices 203, 204 (I1=I2) provided that the electric resistances of the Peltier devices 203, 204 have not been changed due to fatigue as is illustrated at a first number N1 of cycles. In case a fatigue-based increase in electric resistance is experienced with the first Peltier device 203, application of a constant voltage (U) results in a decreased current (I1) running through the first Peltier device (I1<I2). Hence, an increase of electric resistance of the first Peltier device 203 can be observed measuring a relative difference between the first and second currents I1, I2 which increases with rising resistance of the first Peltier device 203.

Based on the above, a method of monitoring (testing the probability of failure of) the first and second Peltier devices 203, 204 comprises

- a first step of applying a constant voltage (U) by means of the power source 205 and measuring the first and second currents (I1, I2) running through the first and second Peltier devices 203, 204 by means of the measurement device 207;
- a second step of calculating a signed difference (ΔI=I1−I2) between the first and second currents (I1, I2) by the controller 206; and
- a third step of comparing the difference (ΔI) between the first and second currents (I1, I2) to a predefined threshold value (T2) which may be an absolute value or a relative value with respect to nominal currents running through the first and second Peltier devices 203, 204 to thus obtain a monitoring result indicating probability of failure of the Peltier devices. For instance, in case a calculated difference (ΔI) between the first and second currents (I1, I2) at least equals the threshold (ΔI≧T2), then it may be concluded that the first Peltier device 203 is likely to fail.

The determined monitoring result is signalized to a user by means of a signalizing device 201 such as a display and/or loudspeaker.

Figure 5:
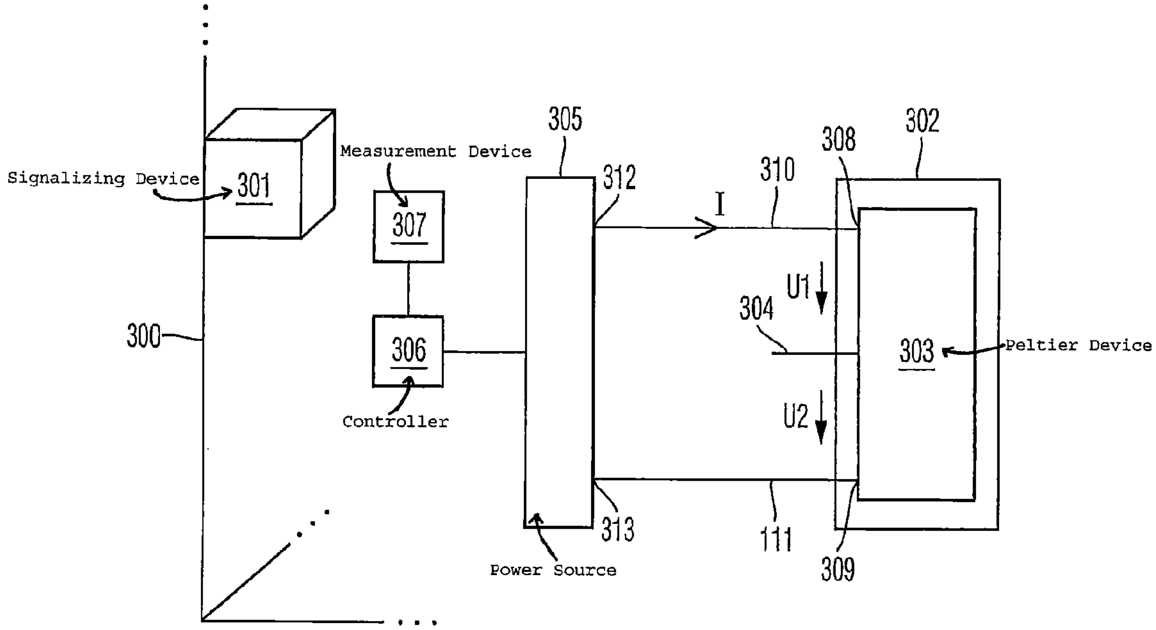
FIG. 5 is a schematic elevational view of an exemplary third embodiment of the system of the invention.

Now referring to FIG. 5, an exemplary third embodiment of the system and method according to the invention is explained. In order to avoid unnecessary repetitions, only differences with respect to the first embodiment of the invention are explained and otherwise reference is made to explanations made above in connection with the first embodiment.

Accordingly, a system 300 for cycling liquid reaction mixtures through a series of temperature excursions for performing the polymerase chain reaction includes a temperature-controlled member 302 which can be heated and cooled, respectively, by means of a (single) Peltier device 303 which is connected with DC power source 305.

More specifically, a first conductive line 310 interconnects a first terminal 308 of the Peltier device 303 and a first pole 312 of DC power source 305 and a second conductive line 311 interconnects a second terminal 309 of the Peltier device 303 and a second pole 313 of DC power source 305. The DC power source 305 can be controlled by means of a microprocessor-based controller 306 so that, for instance, a constant electric current (I) can be applied to the first and second terminals 308, 309 of the Peltier device 303 to heat or cool block 302 depending on the direction of current applied.

A measurement device 307 is connected to the first and second terminals 308, 309 as well as a centered tap 304 for measuring a first voltage drop (U1) across a first portion 314 of the Peltier device 303 and a second voltage drop (U2) across a second portion 315 of the Peltier device 303.

Since first and second portions 314, 315 of the Peltier device 303 are of similar dimensions, applying a constant current (I) will result in a similar voltage drop across the portions 314, 315 (U1=U2) provided that the electric resistances of the portions have not been changed due to fatigue. On the other hand, in case a sharp increase in the electric resistance of the first portion 314 is experienced, when applying a constant current (I) to the first and second terminals 308, 309, an increased voltage drop (U1>U2) across the first portion 314 of the Peltier device 3 can be observed.

Based on the above, an exemplary method of monitoring (testing the probability of failure of) the Peltier device 303 comprises applying a constant current (I) by means of the power source 305 and measuring the first and second voltage drops (U1, U2) across the first and second portions 314, 315 of the Peltier device 303 by means of the electric quantity measurement device 307. The controller 306 then calculates a signed difference (ΔU=U1−U2) between the first and second voltage drops (U1, U2) which then is compared to a preset threshold value (T3) which may be an absolute value or a relative value with respect to nominal voltage drops of the first and second portions of the Peltier device 303 to thus obtain a monitoring result. For instance, in case the calculated difference (ΔU) between the first and second voltage drops (U1, U2) at least equals the threshold (ΔU≧T3) then it may be concluded that the Peltier device 303 is likely to fail and should be replaced. Otherwise, in case the calculated difference (ΔU) is below the threshold (ΔU<T3), then it may be concluded that the Peltier device 3 is operable without enlarged risk for failure. Alternatively, instead of a difference between voltage drops, a difference between electric resistances of the first and second portions 314, 315 of the Peltier device 303, derivable from voltage drops may be compared to a threshold value to obtain a monitoring result.

The determined monitoring result is signalized to a user by means of a signalizing device 301 such as a display and/or loudspeaker.

Above embodiment advantageously allows for testing the probability of failure of a Peltier device even in case a single Peltier device 303 is provided on the temperature-controlled member 302 or, alternatively, is chosen to be used for testing.

In above embodiments, a measurement device is used for measuring an electric quantity in response to applying a constant current and voltage, respectively. The measurement device may include a temperature sensor to measure the temperature of the Peltier devices and/or portions thereof, respectively, in response to applying a constant current and voltage, respectively. The controller is set up in a manner to perform the specific method used for monitoring a Peltier device.

Obviously many modifications and variations of the present invention are possible in light of the above description. It is therefore to be understood, that within the scope of appended claims, the invention may be practiced otherwise than as specifically devised.

| Reference list | |
|---|---|
| 100 | System |
| 101 | Signalizing device |
| 102 | Temperature-controlled member |
| 103 | First Peltier device |
| 104 | Second Peltier device |
| 105 | DC power source |
| 106 | Controller |
| 107 | Electric quantity measurement device |
| 108 | First terminal (first Peltier device) |
| 109 | Second terminal (first Peltier device) |
| 110 | First terminal (second Peltier device) |
| 111 | Second terminal (second Peltier device) |
| 112 | First pole |

-continued

| Reference list | |
|---|---|
| 113 | Second pole |
| 114 | First conductive line |
| 115 | Second conductive line |
| 116 | Third conductive line |
| 200 | System |
| 201 | Signalizing device |
| 202 | Block |
| 203 | First Peltier device |
| 204 | Second Peltier device |
| 205 | DC Power source |
| 206 | Controller |
| 207 | Measurement device |
| 208 | First terminal (first Peltier device) |
| 209 | Second terminal (first Peltier device) |
| 210 | First terminal (second Peltier device) |
| 211 | Second terminal (second Peltier device) |
| 212 | First pole |
| 213 | Second pole |
| 214 | First conductive line |
| 215 | Second conductive line |
| 216 | Third conductive line |
| 217 | Fourth conductive line |
| 300 | System |
| 301 | Signalizing device |
| 302 | Block |
| 303 | Peltier device |
| 304 | Tap |
| 305 | DC power source |
| 306 | Controller |
| 307 | Measurement device |
| 308 | First terminal |
| 309 | Second terminal |
| 310 | First conductive line |
| 311 | Second conductive line |
| 312 | First pole |
| 313 | Second pole |
| 314 | First portion |
| 315 | Second portion |

What is claimed is:

1. A method for monitoring a thermoelectric heating and cooling device of a system for cycling liquid reaction mixtures through a series of temperature excursions, comprising:

applying a first quantity comprising one of an electric current (I) and an electric voltage (U) to said thermoelectric heating and cooling device of said system for cycling liquid reaction mixtures through a series of temperature excursions and measuring a second quantity comprising one of temperature and the other one of the electric current (I) and the electric voltage (U) to obtain a first test value;

applying the first quantity to at least another thermoelectric heating and cooling device and measuring the second quantity to obtain a second test value;

determining a monitoring value on basis of a comparison of said first and second test values;

comparing said monitoring value with at least one predefined threshold value for said monitoring value to obtain a monitoring result indicating a probability of failure of the thermoelectric heating and cooling device.

2. The method according to claim 1, in which an absolute value of said monitoring value is compared with said predefined threshold value to obtain said monitoring result.

3. The method according to claim 1, in which a signed value of said monitoring value is compared with said predefined threshold value to obtain said monitoring result.

4. The method according to claim 1, wherein said monitoring result is output to a signalizing device for signalizing an optical and/or acoustical signal in accordance with said monitoring result.

5. The method according to claim 1, wherein said monitoring result is periodically determined.

6. The method according to claim 1, wherein said monitoring result is determined each time the system is turned on for cycling liquid reaction mixtures through a series of temperature excursions.

7. The method according to claim 1, comprising the following steps:

applying the selected first quantity to a plurality of second thermoelectric heating and cooling devices and measuring the second quantity to obtain plural second test values;

determining a monitoring value based on a comparison of said first test value with said plural second test values.

8. A method for monitoring a thermoelectric heating and cooling device of a system for cycling liquid reaction mixtures through a series of temperature excursions, comprising:

applying a first quantity comprising one of an electric current (I) and an electric voltage (U) to a portion of said heating and cooling device of said system for cycling liquid reaction mixtures through a series of temperature excursions and measuring a second quantity comprising one of temperature and the other one of the electric current (I) and the electric voltage (U) to obtain a first test value;

applying the first quantity to at least another portion of said heating and cooling device and measuring the second quantity to obtain a second test value;

determining a monitoring value based on a comparison of said first and second test values;

comparing said monitoring value with at least one predefined threshold value for said monitoring value to obtain a monitoring result indicating a probability of failure of the thermoelectric heating and cooling device.

9. The method according to claim 8, comprising the following steps:

applying the first quantity to a plurality of second portions of said thermoelectric heating and cooling device of said system for cycling liquid reaction mixtures through a series of temperature excursions and measuring the second quantity to obtain plural second test values;

determining a monitoring value based on a comparison of said first test value with said plural second test values.

10. A system for cycling liquid reaction mixtures through a series of temperature excursions comprising:

at least two thermoelectric heating and cooling devices for cycling said liquid reaction mixtures;

a power source connected to said thermoelectric heating and cooling devices, adapted for supplying a first quantity comprising one of an electric current (I) and an electric voltage (U) to said thermoelectric heating and cooling devices;

at least one measuring device connected to said thermoelectric heating and cooling devices, adapted for measuring a second quantity comprising one of temperature and the other one of the electric current (I) and the electric voltage (U) when applying said first quantity to said thermoelectric heating and cooling devices;

a controller, configured to control:

applying the first quantity comprising one of an electric current (I) and an electric voltage (U) to a first thermoelectric heating and cooling device and measuring the second quantity comprising one of temperature and the other one of the electric current (I) and the electric voltage (U) to obtain a first test value;

applying the first quantity to at least a second thermoelectric heating and cooling device and measuring the second quantity to obtain a second test value;

determining a monitoring value based on a comparison of said first and second test values;

comparing said monitoring value with a pre-defined threshold value for said monitoring value to obtain a monitoring result indicating a probability of failure of the thermoelectric heating and cooling device.

11. The system according to claim 10, further comprising a signalizing device for signalizing optical and/or acoustical signals in accordance with said monitoring result.

12. A system for cycling liquid reaction mixtures through a series of temperature excursions comprising:

at least one thermoelectric heating and cooling device for cycling said liquid reaction mixtures;

a power source connected to said thermoelectric heating and cooling device, adapted for supplying a first quantity comprising one of an electric current (I) and an electric voltage (U) to said thermoelectric heating and cooling device;

at least one measuring device connected to said thermoelectric heating and cooling device, adapted for measuring a second quantity comprising one of temperature and the other one of the electric current (I) and the electric voltage (U) when applying said first quantity to said thermoelectric heating and cooling device;

a controller, configured to control:

applying the first quantity comprising one of an electric current (I) and an electric voltage (U) to a first portion of said thermoelectric heating and cooling device and measuring the second quantity comprising one of temperature and the other one of the electric current (I) and the electric voltage (U) to obtain a first test value;

applying the first quantity to at least a second portion of said thermoelectric heating and cooling device and measuring the second quantity to obtain a second test value;

determining a monitoring value based on a comparison of said first and second test values;

comparing said monitoring value with a pre-defined threshold value for said monitoring value to obtain a monitoring result indicating a probability of failure of the thermoelectric heating and cooling device.

* * * * *